United States Patent
Armbrust et al.

(10) Patent No.: US 9,060,642 B1
(45) Date of Patent: Jun. 23, 2015

(54) MODULAR COOKING AND STEAMING SYSTEM

(76) Inventors: Jeffrey Armbrust, Palm Bay, FL (US); Kristina Armbrust, Palm Bay, FL (US)

(*) Notice: Subject to any disclaimer, the term of this patent is extended or adjusted under 35 U.S.C. 154(b) by 517 days.

(21) Appl. No.: 13/586,584

(22) Filed: Aug. 15, 2012

(51) Int. Cl.
*A47J 27/00* (2006.01)
*A47J 36/08* (2006.01)
*A47J 36/20* (2006.01)

(52) U.S. Cl.
CPC *A47J 36/08* (2013.01); *A47J 36/20* (2013.01); *A47J 2027/006* (2013.01)

(58) Field of Classification Search
CPC ..... A47J 36/08; A47J 36/20; A47J 2027/006; A47J 2027/043
USPC ............ 99/403, 415, 418, 410, 413; 210/474, 210/473, 469; 220/573.1, 912
See application file for complete search history.

(56) References Cited

U.S. PATENT DOCUMENTS

| | | | |
|---|---|---|---|
| 334,560 A * | 1/1886 | Bradford | 210/245 |
| 1,073,141 A * | 9/1913 | Kerlinger | 210/469 |
| 1,265,611 A * | 5/1918 | Clarke | 99/418 |
| 1,589,486 A * | 6/1926 | Sharpneck | 210/465 |
| 4,153,045 A * | 5/1979 | Phelon | 126/381.1 |
| 4,869,160 A | 9/1989 | Pratolongo | |
| 5,351,605 A | 10/1994 | Sai et al. | |
| 5,452,648 A | 9/1995 | Hohler et al. | |
| D543,411 S | 5/2007 | Rittberg | |
| 7,484,455 B2 | 2/2009 | De'Longhi | |
| 2009/0107993 A1 | 4/2009 | Ohyama | |
| 2010/0263552 A1 | 10/2010 | Hendrickson | |

* cited by examiner

*Primary Examiner* — Reginald L Alexander

(57) ABSTRACT

A modular cooking and steaming system includes a generally rectangular open top container with a self-cooling hollow handle for measuring pasta located on the side of the container. The handle has an internal diameter adapted to receive a quantity of pasta for measuring a portion. The system has a graduated water level indicator located on a container front side. The system has a generally rectangular perforated strainer lid adapted to snuggly cover a container open top. For use, a volume of water is poured into the container. The volume of water is measured via the water level indicator. A volume of pasta is measured in the handle then placed in the container for cooking. Upon completion of cooking, the strainer lid is placed on the container for draining the volume of water via the perforated top surface.

15 Claims, 6 Drawing Sheets

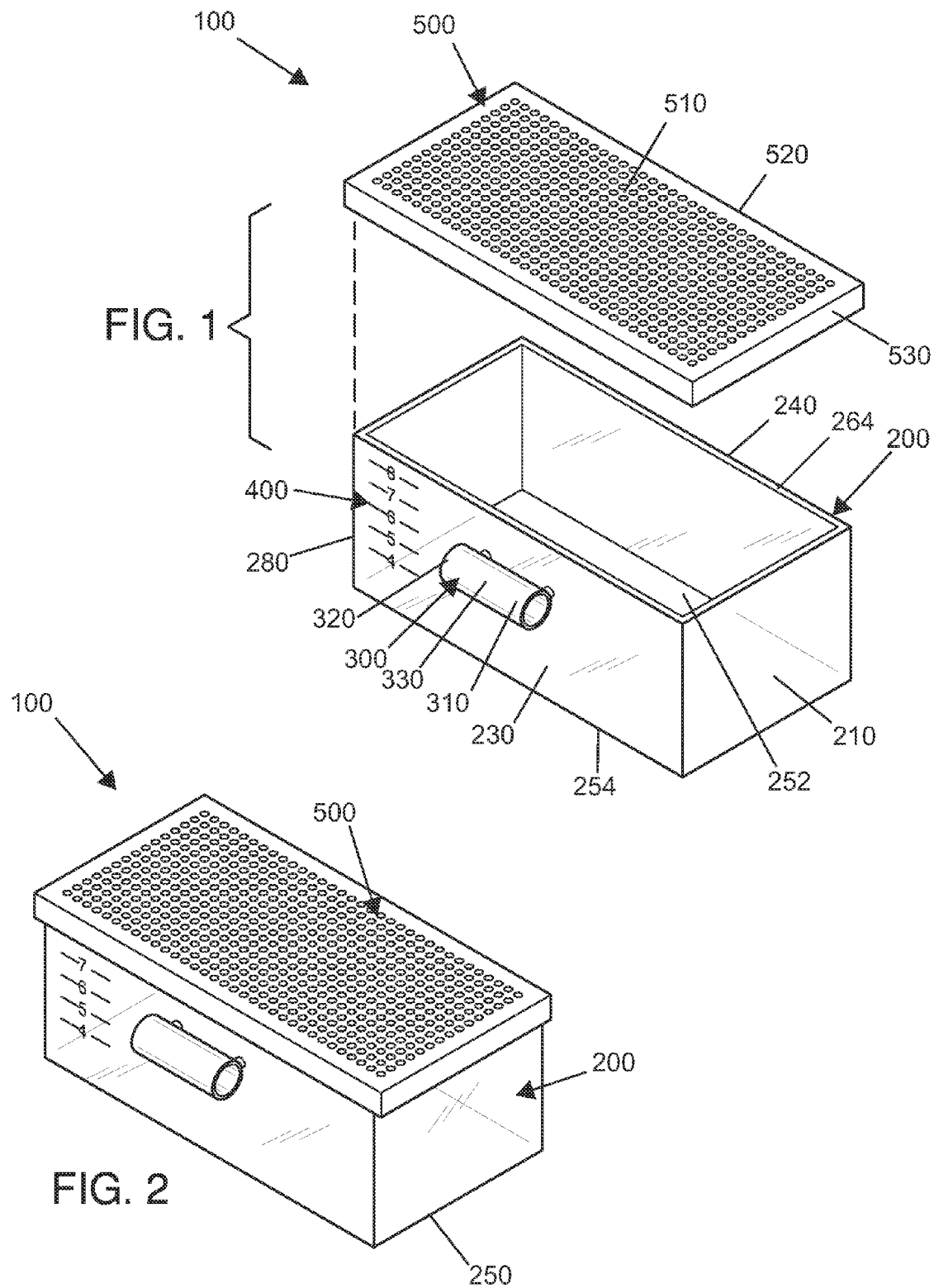

MODULAR COOKING AND STEAMING SYSTEM

BACKGROUND OF THE INVENTION

Pasta is a type of noodle and a staple food of traditional Italian cuisine having references dating to 1154 AD. Pasta is typically made from unleavened dough of wheat flour mixed with water. It is then formed into sheets or various other shapes, cooked in a pan of boiling water, then served in a variety of dishes. Unfortunately, pasta tends to stick together when cooking.

Steaming is a method of cooking using steam and is considered a healthy cooking technique capable of cooking almost all kinds of food. Steaming works by boiling water continuously, causing it to vaporize into steam where it then carries heat to the nearby food, thus cooking the food. The present invention features a modular cooking system for pasta and steaming system.

SUMMARY

The present invention features a modular cooking and steaming system. In some embodiments, the system comprises a generally rectangular open top container. In some embodiments, the system comprises a self-cooling hollow handle for measuring pasta located on the side of the container. In some embodiments, the handle comprises an internal diameter adapted to receive a quantity of pasta inside for measuring a portion. In some embodiments, the system comprises a graduated water level indicator located on a container front side. In some embodiments, the system comprises a generally rectangular perforated strainer lid. In some embodiments, the lid is adapted to snuggly cover a container open top.

In some embodiments, for use, a volume of water is located in the container. In some embodiments, the volume of water is measured via the water level indicator. In some embodiments, a volume of pasta is measured in the handle. In some embodiments, the pasta is located in the container for cooking. In some embodiments, upon completion of cooking, the strainer lid is located on the container for draining the volume of water via the perforated top surface. In some embodiments, a modular cooking and steaming system is for cooking pasta and other foods.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is a perspective view of the present invention.
FIG. 2 is a perspective view of the present invention.

DESCRIPTION OF PREFERRED EMBODIMENTS

Figure 3:
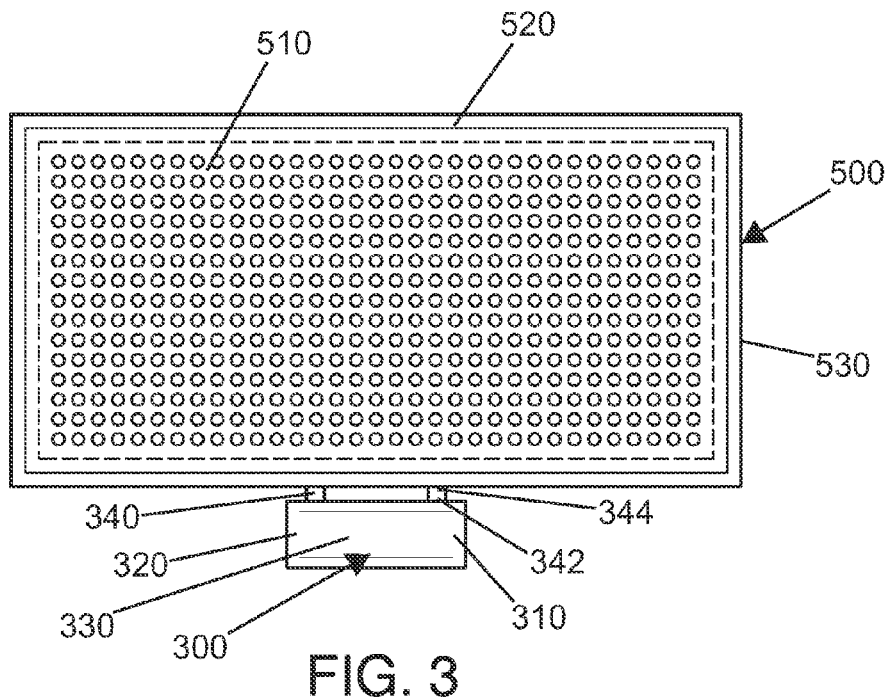
FIG. 3 is a top view of the present invention.
Figure 4:
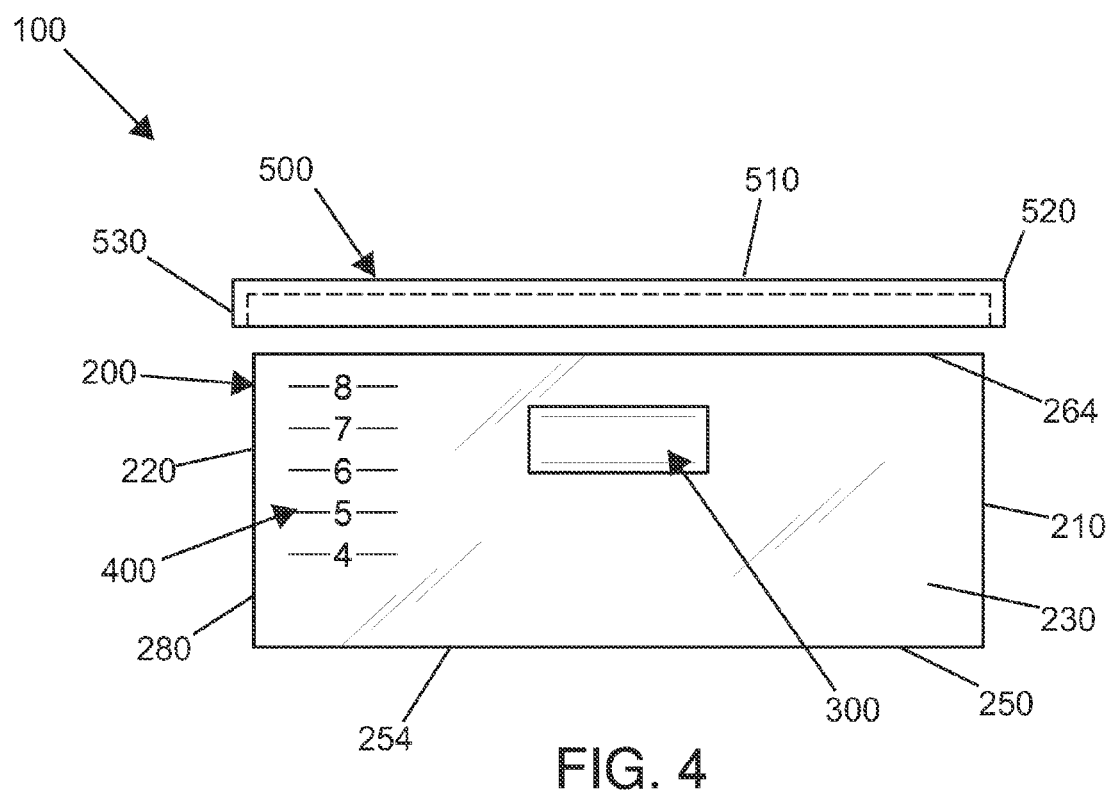
FIG. 4 is a front view of the present invention.
Figure 5:
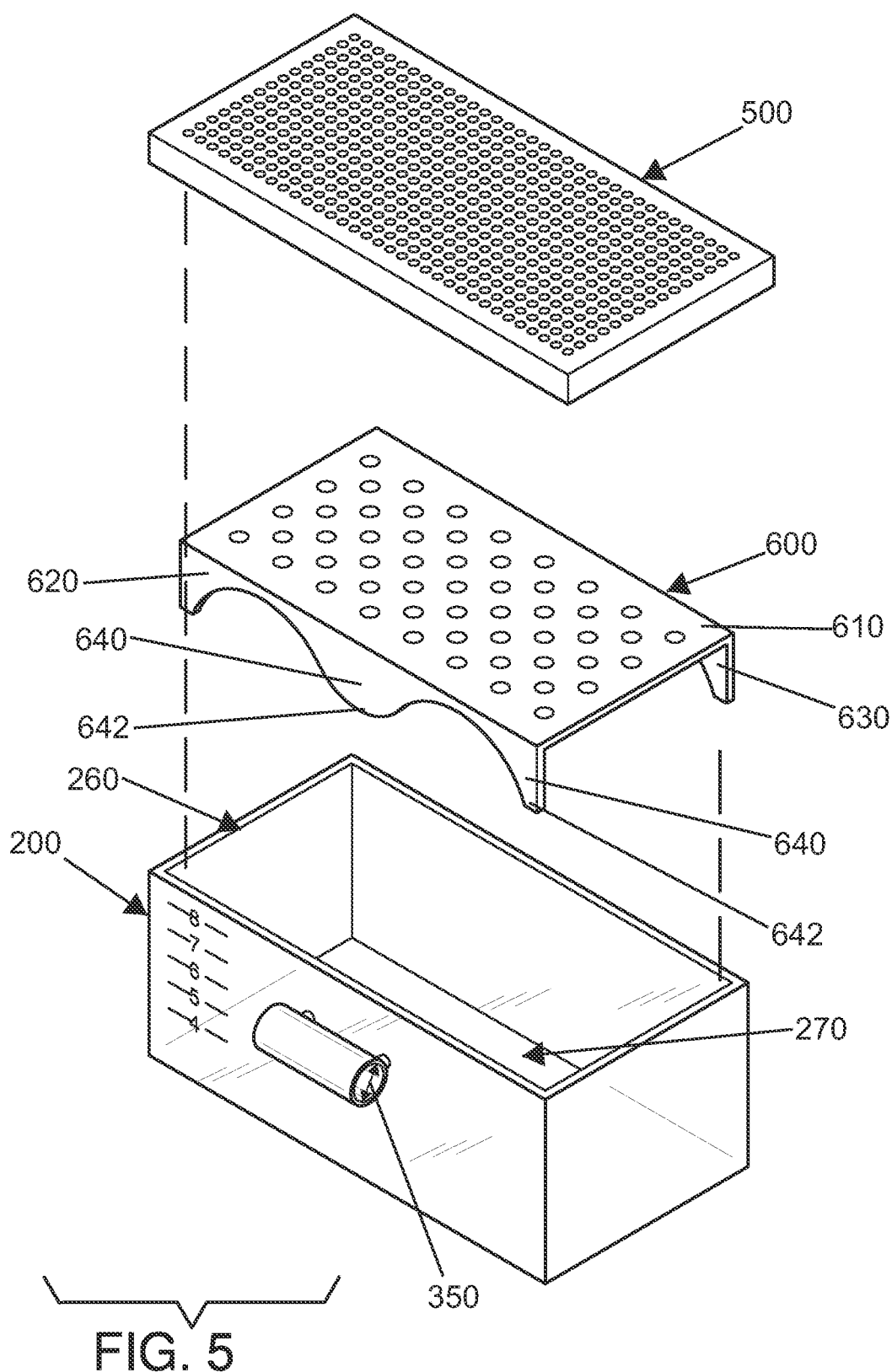
FIG. 5 is a perspective view of an alternate embodiment of the present invention.
Figure 6:
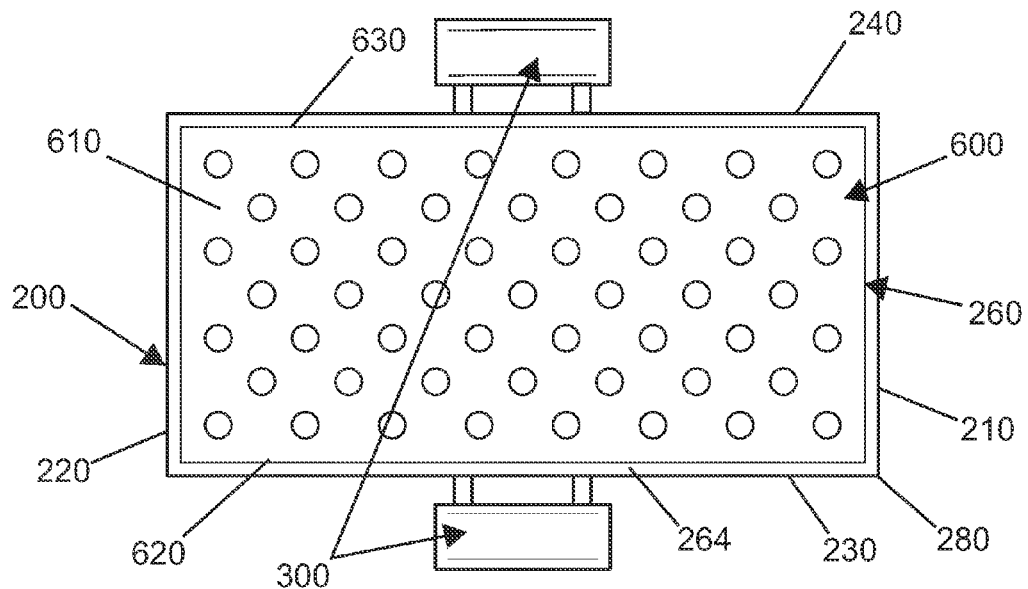
FIG. 6 is a top view of an alternate embodiment of the present invention.
Figure 7:
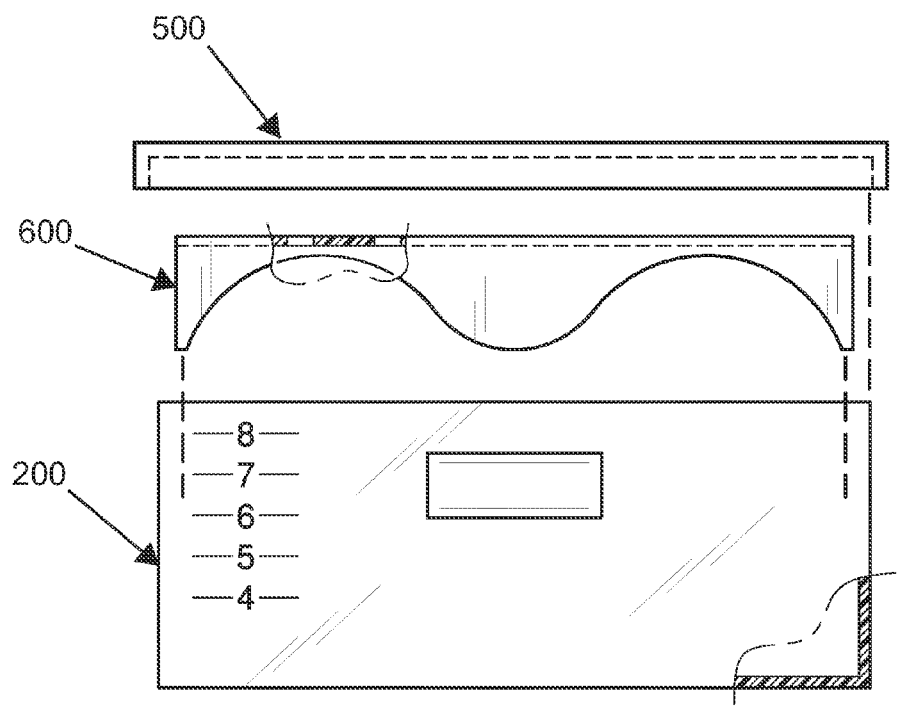
FIG. 7 is a front view of an alternate embodiment of the present invention.
Figure 8:
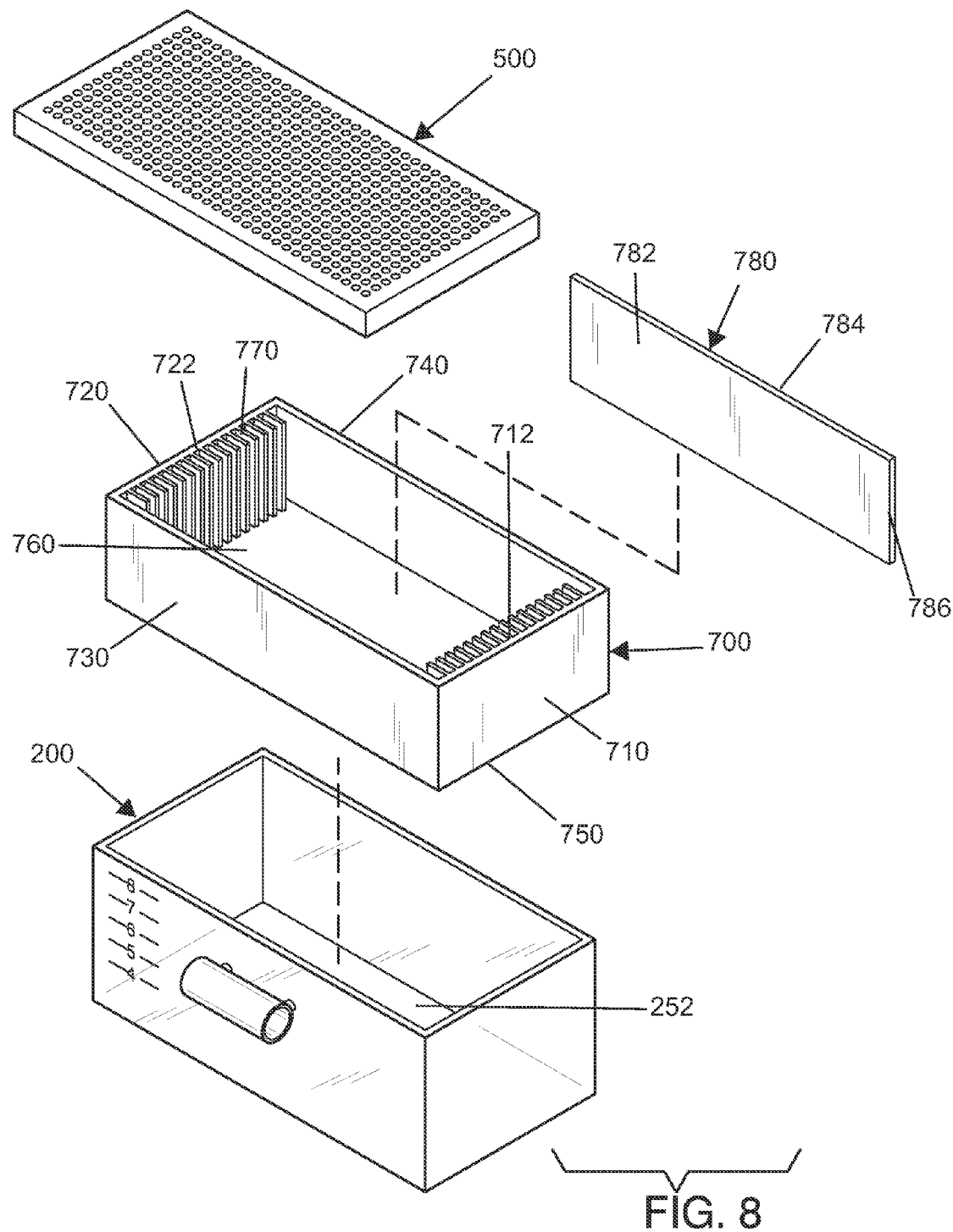
FIG. 8 is a perspective view of an alternate embodiment of the present invention.
Figure 9:
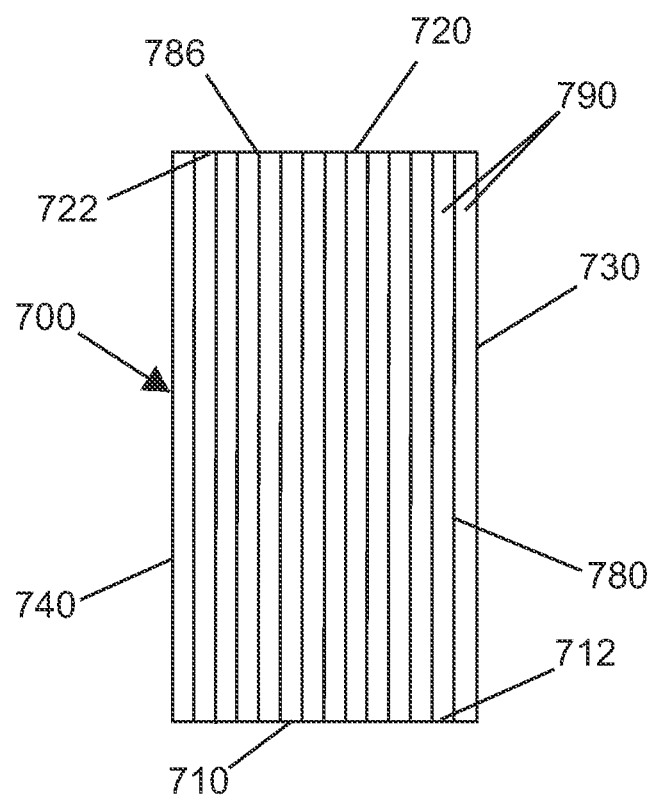
FIG. 9 is a top view of the lasagna holder of the present invention.

Following is a list of elements corresponding to a particular element referred to herein:
100 Modular cooking and steaming system
200 Container
210 Container first side
220 Container second side
230 Container front side
240 Container rear side
250 Container bottom
252 Container bottom inside surface
254 Container bottom edge
260 Container open top
264 Container top edge
270 Container cavity
280 Container side edge
300 Handle
310 Handle first side
320 Handle second side
330 Handle side wall
340 Handle leg
342 Handle leg first side
344 Handle leg second side
350 Handle internal diameter
400 Water level indicator
500 Strainer Lid
510 Lid top surface
520 Lid top surface edge
630 Lid side wall
600 Steamer rack
610 Rack top surface
620 Rack front side
630 Rack rear side
640 Support leg
642 Leg end
700 Lasagna holder
710 Holder first side
712 Holder first side inside surface
720 Holder second side
722 Holder second side inside surface
730 Holder front side
740 Holder rear side
750 Holder open bottom
760 Holder open top
770 Holder channel
780 Holder partition
782 Partition first surface
784 Partition second surface
786 Partition edge
790 Holder cavity Referring now to FIG. 1-9, the present invention features a modular cooking and steaming system (100) for cooking pasta and other foods. In some embodiments, the system (100) comprises a generally rectangular open top container (200) having a container first side (210), an opposing container second side (220), a container front side (230), an opposing container rear side (240), a container bottom (250), and an opposing container open top (260) forming an open container cavity (270) located inside. In some embodiments, container side edges (280) of the outer container first side (210) are located on container side edges (280) of the outer container front side (230) and the outer container rear side (240). In some embodiments, container side edges (280) of the outer container second side (220) are located on container side edges (280) of the outer container front side (230) and the outer container rear side (240). In some embodiments, the container bottom edges (280) of the container first side (210), the container second side (220), the container front side (230), and the container rear side (240) are located on the container side edges (250) of the container bottom (250).

In some embodiments, the system (100) comprises a self-cooling hollow handle (300) for measuring pasta having an open handle first side (310) fluidly connected to an open handle second side (320), a cylindrical handle side wall (330), and a plurality of handle legs (340). In some embodiments, a piece of pasta can fully pass through the hollow handle (300) for measuring a portion. In some embodiments, the handle leg first side (342) is located on the handle side wall (330) and the handle leg second side (344) is located on the container front side (230). In some embodiments, the handle (300) comprises a handle internal diameter (350) adapted to receive a quantity of pasta therein for measuring a portion.

In some embodiments, the system (100) comprises a graduated water level indicator (400) located on the outer container front side (230). In some embodiments, the graduated water level indicator (400) is embossed on the outer container front side (230).

In some embodiments, the system (100) comprises a generally rectangular perforated strainer lid (500) having a perforated lid top surface (510) and a plurality of lid side walls (530) located around a plurality of lid top surface edges (510). In some embodiments, the strainer lid (500) is adapted to snuggly cover the container open top (260). In some embodiments, the plurality of lid side walls (530) overlap an outer periphery of the container open top (260).

In some embodiments, for use, a volume of water is placed in the container cavity (270). In some embodiments, the volume of water is measured via the water level indicator (400). In some embodiments, a volume of pasta is measured in the handle (300). In some embodiments, the pasta is placed in the container cavity (270) for cooking. In some embodiments, upon completion of cooking, the strainer lid (500) is removably located on the container open top (260) for draining the volume of water via the perforated lid top surface (510). In some embodiments, a modular cooking and steaming system (100) is for cooking pasta and other foods.

In some embodiments, a perforated steamer rack (600) is removably located in the container cavity (270). In some embodiments, the steamer rack (600) comprises a perforated rack top surface (610), a rack front side (620), and an opposing rack rear side (630).

In some embodiments, the rack front side (620) comprises a front support leg (640) having a front first side leg end (642), a front second side leg end (642) and a front middle leg end (642). In some embodiments, the rack front side (620) comprises a shape of a curve, for example, a sine wave. In some embodiments, the rack rear side (630) comprises a rear support leg (640) having a first rear side leg end (642), a second rear side leg end (642) and a rear middle leg end (642). In some embodiments, the rack rear side (630) comprises a shape of a curve, for example, a curve resembling a sine wave.

In some embodiments, for use, the steamer rack (600) is removably located in the container cavity (270) having the front first side leg end (642), the front second side leg end (642), the front middle leg end (642), the rear first side leg end (642), the rear second side leg end (642), and the rear middle leg end (642) interfacingly located on a container bottom inside surface (252). In some embodiments, a volume of water is placed in the container cavity (270). In some embodiments, the volume of water is determined via the water level indicator (400). In some embodiments, a measure of food is placed on the horizontal rack top surface (610) for cooking. In some embodiments, upon completion of cooking, the strainer lid (500) is removably located on the container (200) for draining the volume of water via the perforated lid top surface (510).

In some embodiments, a lasagna holder (700) is removably located in the container cavity (270). In some embodiments, the lasagna holder (700) comprises a holder first side (710), an opposing holder second side (720), a holder front side (730), an opposing holder rear side (740), a holder open bottom (750) and an opposing holder open top (760). In some embodiments, the lasagna holder (700) comprises a plurality of holder channels (770) located on a holder first side inside surface (712) from the holder open bottom (750) to the holder open top (760). In some embodiments, the lasagna holder (700) comprises a plurality of holder channels (770) located on a holder second side inside surface (722) from the holder open bottom (750) to the holder open top (760). In some embodiments, the holder channels (770) are adapted to receive a plurality of generally planar holder partitions (780) having a partition first surface (782), a partition second surface (784), and a plurality of partition edges (786). In some embodiments, a first partition edge (786) is located in the holder channel (770) located on the holder first side inside surface (712). In some embodiments, a second partition edge (786) is located in the holder channel (770) located on the holder second side inside surface (722).

In some embodiments, for use, the lasagna holder (700) is removably located in the container cavity (270) having the holder open bottom (750) interfacingly located on a container bottom inside surface (252). In some embodiments, a volume of water is placed in the container cavity (270). In some embodiments, the volume of water is determined via the water level indicator (400). In some embodiments, a measure of lasagna is placed in a plurality of holder cavities (790) formed by the plurality of holder partitions (780). In some embodiments, upon completion of cooking, the steamer lid is removably located on the container (200) for draining the volume of water via the perforated lid top surface (510).

In some embodiments, the system (100) comprises a second hollow handle (300) located on the container rear side (240). In some embodiments, the second hollow handle (300) comprises a second handle internal diameter (350) adapted to receive a quantity of pasta inside for measuring a different-sized portion than the portion measured by the first hollow handle (300) having a first handle internal diameter (350).

In some embodiments, the hollow handle (300) comprises a handle internal diameter (350) of about ½ inch. In some embodiments, the hollow handle (300) comprises a handle internal diameter (350) of about ¾ inch. In some embodiments, the hollow handle (300) comprises a handle internal diameter (350) of about 1 inch. In some embodiments, the hollow handle (300) comprises a handle internal diameter (350) greater than 1 inch. In some embodiments, the hollow handle (300) comprises a handle internal diameter (350) less than ½ inch.

In some embodiments, the container (200) is transparent or translucent. In some embodiments, the container (200) is constructed from a glass in some embodiments, the container (200) is constructed from a plastic. In some embodiments, the container (200) is constructed from a metal. In some embodiments, the container (200) is constructed from a composite.

As used herein, the term "about" refers to plus or minus 10% of the referenced number. For example, an embodiment wherein the container is about 10 inches in length includes a container that is between 9 and 11 inches in length.

The disclosures of the following U.S. Patents are incorporated in their entirety by reference herein: U.S. Pat. No. D 543,411 U.S. Pat. Pub. No. 2010/0263552; U.S. Pat. Pub No. 2009/0107993; U.S. Pat. No. 7,484,455; U.S. Pat. No. 5,452,648; U.S. Pat. No. 5,351,605; U.S. Pat. No. 4,869,160.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A modular cooking and steaming system (100) for cooking pasta and other foods, wherein the system (100) comprises:
   (a) a generally rectangular open top container (200) having a container first side (210), an opposing container second side (220), a container front side (230), an opposing container rear side (240), a container bottom (250), and an opposing container open top (260) forming an open container cavity (270) disposed therein, wherein container side edges (280) of the outer container first side (210) are disposed on container side edges (280) of the outer container front side (230) and the outer container rear side (240), wherein container side edges (280) of the outer container second side (220) are disposed on container side edges (280) of the outer container front side (230) and the outer container rear side (240), wherein container bottom edges (254) of the container first side (210), the container second side (220), the container front side (230), and the container rear side (240) are disposed on container side edges (280) of the container bottom (250);
   (b) a self-cooling hollow handle (300) for measuring pasta having an open handle first side (310) fluidly connected to an open handle second side (320), a cylindrical handle side wall (330), and a plurality of handle legs (340), wherein the handle leg first side (342) is disposed on the handle side wall (330) and the handle leg second side (344) is disposed on the container front side (230), wherein the handle (300) comprises a handle internal diameter (350) adapted to receive a quantity of pasta therein for measuring a portion;
   (c) a graduated water level indicator (400) disposed on the outer container front side (230); and
   (d) a generally rectangular perforated strainer lid (500) having a perforated lid top surface (510) and a plurality of lid side walls (530) disposed around a plurality of lid top surface edges (520), wherein the strainer lid (500) is adapted to snuggly cover the container open top (260), wherein the plurality of lid side walls (530) overlap an outer periphery of the container open top (260);
   wherein for use, a volume of water is disposed in the container cavity (270), wherein the volume of water is measured via the water level indicator (400), wherein a volume of pasta is measured in the handle (300), wherein the pasta is disposed in the container cavity (270) for cooking, wherein upon completion of cooking, the strainer lid (500) is removably disposed on the container open top (260) for draining the volume of water via the perforated lid top surface (510), wherein a modular cooking and steaming system (100) is for cooking pasta and other foods.

2. The system (100) of claim 1, wherein a perforated steamer rack (600) is removably disposed in the container cavity (270), wherein the steamer rack (600) comprises a perforated rack top surface (610), a rack front side (620), and an opposing rack rear side (630),
   wherein the rack front side (620) comprises a front support leg (640) having a front first side leg end (642), a front second side leg and (642) and a front middle leg end (642), wherein the rack front side (620) comprises a shape of a curve, wherein the rack rear side (630) comprises a rear support leg (640) having a first rear side leg end (642), a second rear side leg end (642) and a rear middle leg end (642), wherein the rack rear side (630) comprises a shape of a curve,
   wherein for use, the steamer rack (600) is removably disposed in the container cavity (270) having the front first side leg end (642), the front second side leg end (642), the front middle leg end (642), the rear first side leg end (642), the rear second side leg end (642), and the rear middle leg end (642) interfacingly disposed on a container bottom inside surface (252), wherein a volume of water is disposed in the container cavity (270), wherein the volume of water is determined via the water level indicator (400), wherein a measure of food is disposed on the horizontal rack top surface (610) for cooking, wherein upon completion of cooking, the strainer lid (500) is removably disposed on the container (200) for draining the volume of water via the perforated lid top surface (510).

3. The system (100) of claim 1, wherein a lasagna holder (700) is removably disposed in the container cavity (270), wherein the lasagna holder (700) comprises a holder first side (710), an opposing holder second side (720), a holder front side (730), an opposing holder rear side (740), a holder open bottom (750) and an opposing holder open top (760), wherein the lasagna holder (700) comprises a plurality of holder channels (770) disposed on a holder first side inside surface (712) from the holder open bottom (750) to the holder open top (760), wherein the lasagna holder (700) comprises a plurality of holder channels (770) disposed on a holder second side inside surface (722) from the holder open bottom (750) to the holder open top (760), wherein the holder channels (770) are adapted to receive a plurality of generally planar holder partitions (780) having a partition first surface (782), a partition second surface (784), and a plurality of partition edges (786), wherein a first partition edge (786) is disposed in the holder channel (770) disposed on the holder first side inside surface (712), wherein a second partition edge (786) is disposed in the holder channel (770) disposed on the holder second side inside surface (722),
   wherein for use, the lasagna holder (700) is removably disposed in the container cavity (270) having the holder open bottom (750) interfacingly disposed on a container bottom inside surface (252), wherein a volume of water is disposed in the container cavity (270), wherein the volume of water is determined via the water level indicator (400), wherein a measure of lasagna is disposed in a plurality of holder cavities (790) formed by the plurality of holder partitions (780), wherein upon completion of cooking, the steamer lid is removably disposed on the container (200) for draining the volume of water via the perforated lid top surface (510).

4. The system (100) of claim 1, wherein the system (100) comprises a second hollow handle (300) disposed on the container rear side (240).

5. The system (100) of claim 4, wherein the second hollow handle (300) comprises a second handle internal diameter (350) adapted to receive a quantity of pasta therein for measuring a different-sized portion than the portion measured by the first hollow handle (300) having a first handle internal diameter (350).

6. The system (100) of claim 1, wherein the hollow handle (300) comprises a handle internal diameter (350) of about ½ inch.

7. The system (100) of claim 1, wherein the hollow handle (300) comprises a handle internal diameter (350) of about ¾ inch.

8. The system (100) of claim 1, wherein the hollow handle (300) comprises a handle internal diameter (350) of about 1 inch.

9. The system (100) of claim 1, wherein the hollow handle (300) comprises a handle internal diameter (350) greater than 1 inch.

10. The system (100) of claim 1, wherein the hollow handle (300) comprises a handle internal diameter (350) less than ½ inch.

11. The system (100) of claim 1, wherein the container (200) is transparent or translucent.

12. The system (100) of claim 1, wherein the container (200) is constructed from a glass.

13. The system (100) of claim 1, wherein the container (200) is constructed from a plastic.

14. The system (100) of claim 1, wherein the container (200) is constructed from a metal.

15. The system (100) of claim 1, wherein the container (200) is constructed from a composite.

\* \* \* \* \*